United States Patent

[11] 3,588,234

| [72] | Inventor | Paul Frederic Gambs<br>140, Rue Mazenold 69, Lyon, France |
|---|---|---|
| [21] | Appl. No. | 807,788 |
| [22] | Filed | Mar. 17, 1969 |
| [45] | Patented | June 28, 1971 |
| [32] | Priority | Mar. 18, 1968 |
| [33] | | France |
| [31] | | 144,244 |

[54] OPTICAL DEVICE FOR MOVING A LUMINOUS TARGET ACROSS THE EYES
8 Claims, 3 Drawing Figs.

| [52] | U.S. Cl. | 351/13, 351/1, 351/6, 351/16 |
|---|---|---|
| [51] | Int. Cl. | A61b 3/10 |
| [50] | Field of Search | 351/1, 6, 13, 14, 16 |

[56] References Cited
UNITED STATES PATENTS

| 2,448,140 | 8/1948 | Bonaventura | 351/6 |
| 3,466,122 | 9/1969 | Ben-Tovim | 351/1X |

*Primary Examiner*—David Schonberg
*Assistant Examiner*—Paul A. Sacher
*Attorneys*—Robert E. Burns and Emmanuel J. Lobato ABSTRACT: An optical device for effecting movement of a luminous target along variable converging directions in the eye is provided with a reflecting system. The luminous target is mounted for pivotal movement relative to the reflecting system about an axis passing through a point conjugate with the center of the eye being examined. The reflecting system itself is mounted for rotational movement and suitable indicia are provided to indicate both the amounts of relative pivotal movement and rotational movement. The optical device is also provided with a plurality of screws for removably attaching same to an ocular instrument, such as an ophthalmometer.

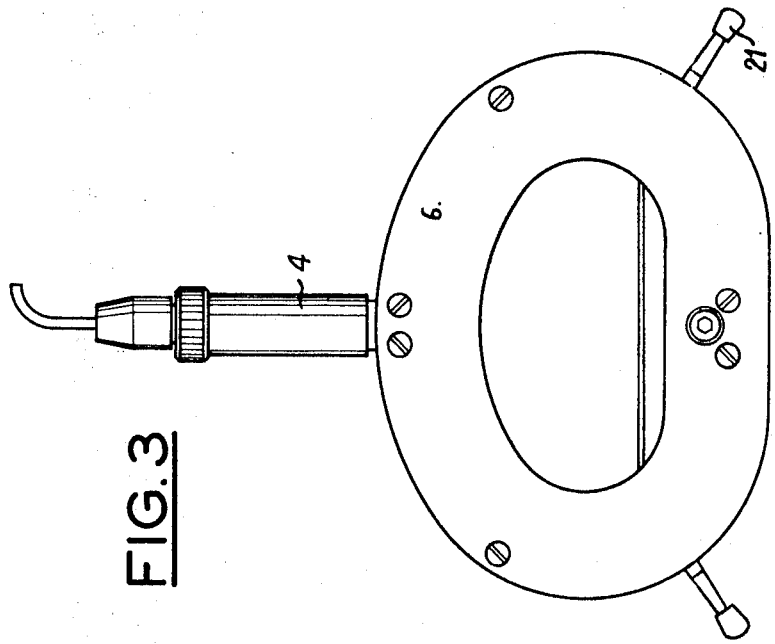
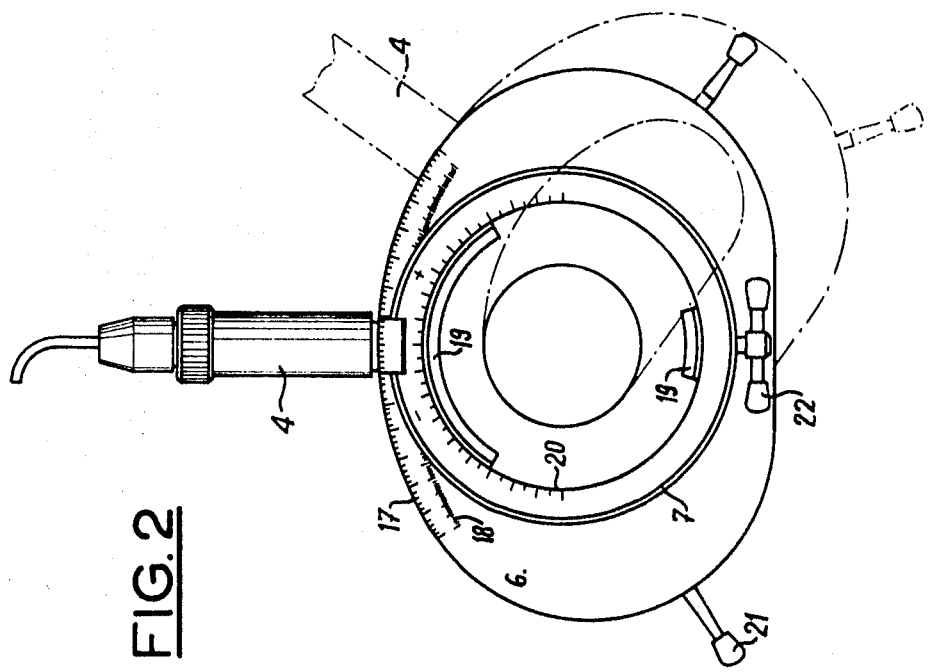

OPTICAL DEVICE FOR MOVING A LUMINOUS TARGET ACROSS THE EYES

A certain number of diagnostic eye examinations require that a visual movable test target be presented in front of the patient's eye under various converging incidences. Thus the kinetic study of the visual field is based upon the appearance or disappearance indicated by the patient of a movable index while he fixedly stares at a given point. The limits of incidence of the test target upon the eye determine the limit of the visual field.

Similarly, biomicroscopy, ophthalmoscopy and in retinography, there is frequently used a movable fixing point or target whose incidence with respect to the optical axis of the apparatus is used to obtain, at different takes, comparable images of a part of the eye which are determined with precision.

There are often used for diagnosing strabismus two test targets, one seen by the right eye and the other by the left eye. Relative movements of the targets brings them in positions where they appear superimposed to the subject. The data resulting from such diagnosing define the characteristics of the binocular vision of the patient tested.

Topographic ophthalmometry uses an ophthalmometer which is fixed relative to the head of the patient to define the curvature of the cornea. The eye under examination moving in such a way as to show in front of the ophthalmometer the different points of its corneal surface. The technique for accomplishing this is to show the subject being examined a movable fixing point or test target whose position relative to the measuring axis of the ophthalmometer is precisely defined.

Consequently, an object of the present invention is to provide an optical device for presenting a visual test target along variable converging directions which will be of simple construction and reduced volume while allowing for a precise and practical use in combination with different optical apparatus.

To this effect, the invention is concerned with an optical device for presenting a visual test target image along converging variable directions characterized in that it comprises a luminous test target reflecting in the direction of the eye through a reflecting system. The test target is rotatable relative to the reflecting system at least one axis passing through the conjugated optical point of a point located inside the eye relative to the reflecting system.

The invention will be better understood by referring to the following description given by way of nonlimiting example and to the accompanying drawing in which:

FIG. 2 shows a rear view of the device; and

FIG. 3 shows a front view of the device.

Figure 1:
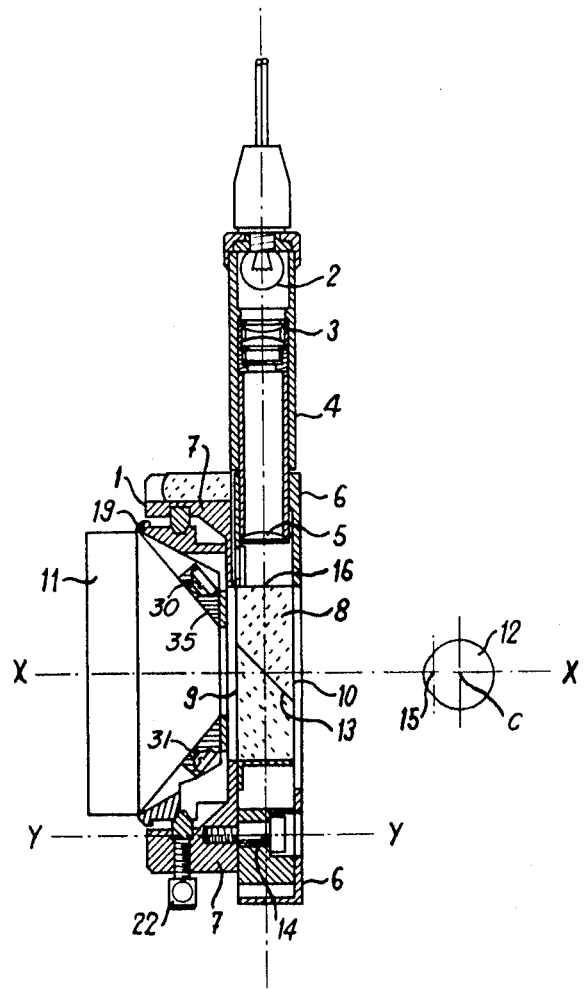
FIG. 1 shows an axial cross section of the device according to the invention.

Device 1 comprises a luminous source 2 constituting a luminous target which is viewed through an optical system 3 comprising lenses and a diaphragm. Source 2 and the optical system 3 are housed in a tube 4 carrying objective 5 by means of which the luminous target is focused at infinity. The tube 4 is mounted on a frame 6 of the device.

A second frame 7 carries a reflective optical system 8 of glass having two flat parallel surfaces 9 and 10 perpendicular to an axis X-X of an ophthalmoscopic apparatus 11. The optical system 8 thus acts as a blade with parallel sides and does not interfere with measurements effected by the ophthalmometer 11 on an eye 12 of the subject being tested.

The optical system 8 comprises a semireflective flat surface 13 inclined, for example at 45°, to the optical axis X-X. This surface 13 makes it possible to reflect the target image along a viewing path toward the eye 12 by the objective 5 the luminous test target image projected by the objective 5, the axis of the tube 4 being located in a meridian plane containing the axis X-X. The frame 6 is pivotal about an axis Y-Y parallel to the axis X-X and passing through a point 14 which is optically conjugated relative to the optical system 8 at the center of rotation C of the eye 12. The upper side 16 of the optical system 8 is flat and parallel to the axis X-X. It can also be spherical with its center at point 14. As a result, upon rotation of the frame 6 about axis Y-Y the luminous beam constituting the test target passes through the center of rotation C of the eye 12. It is thus possible to direct the luminous beam of the test target along a variable incidence upon the eye 12.

The eccentricity of the direction of the target is measured by the position of suitable indicia comprising a marker on the frame 7 cooperating with an angular graduation 17 carried by the frame 6. This angular graduation 17 can include a graduation in eccentric measures 18 and also concentric to axis Y-Y.

The frame 7 supporting the optical system 8 can itself be rotatably mounted on a frame 19 which is fixed on the extremity of the ophthalmometer 11. With such a construction the assembly of the frames 7 and 6 are rotatable about the optical axis X-X in such a way as to enable the taking as a reference plane either the meridian plane (not shown) passing through the axis (not shown) of projection of the ophthalmometers aiming points, or a meridian plane which is oblique relative to this latter. An angular graduation 20 is used to determine the angular position of the frame 7 relative to this polygonal meridian plane. The rotational maneuvers are facilitate by two small handles 21 fast on the frame 6. A screw 22 is provided to prevent the rotation of the frame 7 which carries the optical system 8 relative to the ophthalmometer.

It goes without saying that when device 1 is used in combination with apparatus other than an ophthalmometer 11, the point 14 can become the conjugate of the optical center 15 along the eye 12. To this effect, it suffices to move the eye 12. The device 1 is removably attached to the ophthalmometer 11 by means of threaded screws 30, 31. The ophthalmometer and the device of the present invention have mating tapered surfaces 35 which abut together in a predetermined relationship to simply and accurately effect alignment therebetween.

It is additionally possible to mount the tube 4 carrying the source 2 and

It goes without saying that when device 1 is used in combination with apparatus other than an ophthalmometer 11, the point 14 can become the conjugate of the optical center 15 along the eye 12. To this effect, it suffices to move the eye 12. The device 1 is removably attached to the ophthalmometer 11 by means of threaded screws 30, 31. The ophthalmometer and the device of the present invention have mating tapered surfaces 35 which abut together in a predetermined relationship to simply and accurately effect alignment therebetween.

It is additionally possible to mount the tube 4 carrying the source 2 and objective 5 for movement about the second axis passing through the conjugated point 14 and perpendicular to the plane formed by the axis X-X and Y-Y. As a modification, the tube 4 can be mounted on a ball joint centered at the point 14 in order to freely move about this point.

Although the invention has been described with respect to one particular embodiment thereof, it is understood that the same is in no way limited thereto and that there can be brought to it all modifications of change of materials without thereby departing from its concept or framework.

I claim:

1. An optical device removably attachable to an ocular instrument comprising: means defining a luminous target; directing means for directing an image of said luminous target along an optical axis; optical means positioned along said optical axis receptive of said luminous target image for optically directing same along a viewing path to an eye of a person being examined; mounting means mounting said directing means and said optical means for eccentric movement about an axis passing through a point conjugate with the center of rotation of the eye being examined; and attaching means for removably attaching the optical device to an ocular instrument.

2. Device according to claim 1; wherein said luminous target has a center of rotation which is at the optical conjugate at the center of rotation of the eye being examined.

3. An optical device according to claim 1; wherein said directing means includes a lens system effective to direct said luminous target image along said optical axis toward said optical means.

4. An optical device according to claim 3; including a frame having said directing means connected thereto; and wherein said mounting means includes means pivotally mounting said frame for pivotal movement about said axis passing through said point conjugate with the center of rotation of the eye.

5. An optical device according to claim 1; including means mounting said optical means for rotation about an axis defined by said viewing path; and indicating means for visually indicating the amount of rotation of said optical means with respect to a predetermined angular position.

6. An optical device according to claim 1; wherein said optical means comprises semireflective surface inclined with respect to said optical axis to reflect said luminous target along said viewing path.

7. An optical device according to claim 1; wherein said optical means comprises a pair of glass members having inclined mating surfaces disposed along said optical axis to reflect said luminous target image along said viewing path.

8. An optical device according to claim 1; wherein said attaching means comprises a plurality of threaded screws.